US008565906B1

(12) United States Patent
Alexander et al.

(10) Patent No.: US 8,565,906 B1
(45) Date of Patent: Oct. 22, 2013

(54) AUDIO PROCESSING IN A SOCIAL ENVIRONMENT

(75) Inventors: Jeffrey H. Alexander, Arlington, MA (US); Paul B. Lamere, Nashua, NH (US); Seth T. Proctor, Concord, MA (US)

(73) Assignee: Oracle America, Inc., Redwood City, CA (US)

( * ) Notice: Subject to any disclaimer, the term of this patent is extended or adjusted under 35 U.S.C. 154(b) by 1050 days.

(21) Appl. No.: 11/863,872

(22) Filed: Sep. 28, 2007

(51) Int. Cl.
*G06F 17/00* (2006.01)

(52) U.S. Cl.
USPC .............................................. 700/94; 463/35

(58) Field of Classification Search
USPC .............................................. 700/94; 463/35
See application file for complete search history.

(56) References Cited

U.S. PATENT DOCUMENTS

| 2006/0111188 A1* | 5/2006 | Winkler ........................ 463/42 |
| 2006/0288041 A1* | 12/2006 | Plastina et al. ............ 707/104.1 |
| 2008/0091509 A1* | 4/2008 | Campbell et al. ............... 705/10 |
| 2008/0091717 A1* | 4/2008 | Garbow et al. ........... 707/104.1 |

* cited by examiner

*Primary Examiner* — Joseph Saunders, Jr.
(74) *Attorney, Agent, or Firm* — Brooks Kushman P.C.

(57) ABSTRACT

Example embodiments herein include an audio manager that identifies at least one user in a social environment (e.g., multiplayer gaming environment). Each user in the social environment has a respective user music profile that contains audio attributes for various types of audio. The audio manager combines the user music profile from each user to form a group music profile. The audio manager further identifies a selection of audio segments to be rendered in the social environment that match the group music profile. Additionally, the audio manager processes the selection of audio segments against the audio attributes of at least one user to determine an audio segment to be rendered in the social environment. In one embodiment, the audio manager processes the selection of audio segments in accordance with a social value metric. In turn, the audio manager renders the audio segment in the social environment in accordance with the social value metric.

14 Claims, 8 Drawing Sheets

AUDIO PROCESSING IN A SOCIAL ENVIRONMENT

BACKGROUND

Conventional computerized devices provide users with social environments such as entertainment environments, games, educational software, simulation software, etc. Users (i.e., players of the game) can participate in the social environments through the use of computerized devices (i.e., personal computers, cell phones, hand held computing devices, etc.). These computerized devices also allow users to participate in the social environment online (i.e., connecting to a social environment via the Internet). Connecting to an online social environment allows users to participate along with other users who are also connected to the social environment (e.g., users connected via the Internet).

Social environments may provide audio (e.g., music) to enhance the overall user experience. Music can set the mood of the digital environment. For example, a user participating in a social environment, such as a multiplayer gaming environment that involves intense war scenarios, may hear suspenseful music during a battle scene. Likewise, upon winning against an opponent within the battle scene, the user may be rewarded by hearing victorious music. As another example, a student interacting with an educational software program may hear upbeat music when the student answers a question correctly. Conversely, the student may hear less upbeat music when the student incorrectly answers a question.

Conventional social environment applications provide pre-determined audio (e.g., background music, sound effects, etc.) for each user that interacts with the social environment. In other words, such social environment applications can vary the audio rendered during a particular time or event for different users. For example, conventional social environment applications may render intense music during an action sequence, and render slow or mellow music during a less intense and casual sequence of events. Although the music may vary according to a particular event or scenario in the social environment, the music being rendered by the social environment application has been predetermined. In other words, the programmers and/or designers of conventional social environments dictate the various audio themes that are rendered for different users during interaction with the social environment by pre-programming the music for the given event or scenario.

SUMMARY

Embodiments disclosed herein include an audio management system that dynamically determines the audio (e.g., background music, sound effects, etc.) to be played in an interactive social environment in order to accommodate the unique audio preferences and tastes of the users interacting with the social environment.

In one example embodiment, an audio manager determines audio to be rendered to the different users of a social environment by choosing the various audio segments according to a group music profile. The group music profile is a statistical model representing the collective audio (e.g., musical) tastes and preferences of the users interacting with the social environment. In particular, the group music profile is an aggregation of individual music profiles (e.g., individual statistical models) associated with the users of the social environment. Thus, when determining which audio segment is to be rendered at a particular time or event in the social environment, the audio manager selects the audio segment according to the group music profile in order to provide background audio or music most suitable to the users' personal preferences and tastes.

According to another example embodiment, the audio manager determines the audio segments to be rendered according to a user's respective disposition in the social environment. For example, the audio manager may reward a victorious or high-ranking user by selecting audio segments having the closest statistical match to that user's individual music profile. Conversely, the audio manager may punish a losing or low-ranking user by selecting audio segments having the furthest statistical match to that user's individual music profile.

Note that the audio manager may also select audio segments from a collective pool of audio segments provided by the users of the social environment. As a result, in one embodiment the audio manager determines the audio to be rendered (e.g., according to the group music profile) by selecting audio segments that have been provided by the users of the social environment.

More specifically, example embodiments herein include an audio manager that identifies at least one user in a social environment (e.g., multiplayer gaming environment). Each user in the social environment has a respective user music profile that contains audio attributes for various types of audio. The audio manager further identifies a selection of audio segments to be rendered in the social environment. In operation, the audio manager processes the selection of audio segments against the audio attributes of at least one user to determine an audio segment to be rendered in the social environment.

In one embodiment, the audio manager processes the selection of audio segments in accordance with a social value metric. In turn, the audio manager renders the audio segment in the social environment in accordance with the social value metric.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

In addition, other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems, Inc. of Santa Clara, Calif.

As discussed above, techniques herein are well suited for use in social environment applications (e.g., interactive multiplayer games). However, it should be noted that embodiments herein are not limited to use in such applications and that the techniques discussed herein are well suited for other applications as well.

Note that each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

According to example embodiments, an audio management system dynamically determines audio segments to be rendered in an interactive social environment (e.g., online gaming environment) to accommodate the unique audio preferences and tastes of the users interacting with the social environment.

Figure 1:
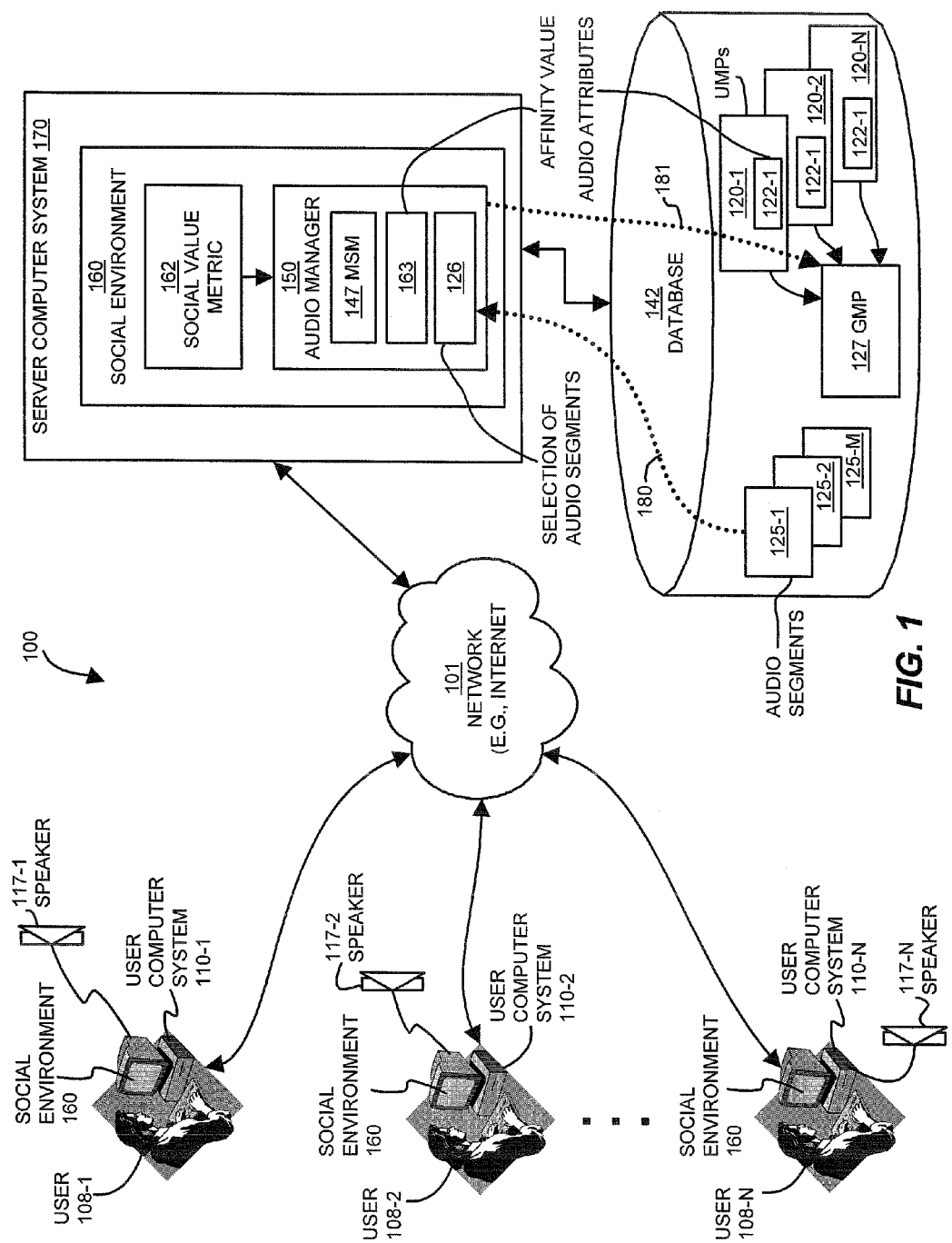
FIG. 1 is an example block diagram of a system for an interactive social environment in accordance with one example configuration.

FIG. 1 is a block diagram that depicts a system 100 for an interactive social environment (e.g., multiplayer online gaming environment, a workout facility, a coffee shop, etc.) that includes multiple users 108 (e.g., user 108-1, user 108-2, ... user 108-N) each associated with a respective user computer system 110 (e.g., user computer system 110-1, user computer system 110-2, ... user computer system 110-N) and speaker 117 (e.g., speaker 117-1, speaker 117-2, ... speaker 117-N). The speakers 117 can be any type of device that renders audio in connection with the user computer systems 110.

During operation, the user computer systems 110 render a social environment 160 that is common and accessible to each user 108 in the system 100. The speakers 177, in turn, render audio associated with the social environment 160.

Still referring to FIG. 1, each user computer system 110 is shown communicating with a server computer system 170 across a network 101 (e.g., local area network, wide area network, the Internet, etc.). In one embodiment, the server computer system 170 provides the social environment 160 (e.g., as executable code) to the user computer systems 110 and interacts with the user computer systems 110 in a typical client-server configuration.

Typically, as in one specific embodiment, the social environment implements an audio manager 150 that processes and administers the audio (e.g., background music, sound effects, etc.) associated with the implementation of the social environment 160 on the user computer systems 110. The audio manager 150 processes one or more social value metrics 162 in conjunction with one or more music similarity models "MSMs" 147 to determine various audio segments to be rendered by the speakers 117 associated with the user computer systems 110. Processing of the social value metrics 162 and music similarity models 147 are discussed in more detail below.

It should be noted that, in accordance with one embodiment, the user computers 110 can communicate with one another (e.g., as part of the social environment 160) independently from the server computer system 170 using techniques such as, for example, peer-to-peer communications.

According to one embodiment, the music similarity model 147 receives two songs as an input and returns a distance score that indicates the similarity or dissimilarity of the two inputted songs. Song pairs that are more similar return a lower distance score than song pairs that are more dissimilar. In one configuration, the music similarity model 147 contains a music similarity space. To satisfy a similarity request (e.g., of two songs), the music similarity model 147 positions the two songs of the request in the music similarity space and returns the distance score representative of the similarity or dissimilarity between the two songs in this space. The music similarity model 147 can be built using several types of similarities including, for instance, acoustic similarity, social similarity (collaborative filtering), bibliographic similarity, combinations of aforementioned types, etc.

Referring again to FIG. 1, a database 142 is shown that contains a group music profile "GMP" 127, user music profiles "UMP" 120 (e.g., user music profile 120-1, 120-2, ... 120-N), and audio segments 125 (e.g., audio segment 125-1, audio segment 125-2, ... audio segment 125-M). In one example embodiment, each user music profile 120 is a music profile that corresponds to a respective user 108 of the social environment 160. Additionally, the user music profiles 120 contain audio attributes 122 (e.g., audio attributes 122-1, 122-2, ... 122-N) associated with each respective user 108.

As will be discussed in more detail below, during operation the audio manager 150 identifies a selection of audio segments 126 from the group of audio segments 125 in database 142.

Note that the database 142 can reside in the server computer system 170 or, as shown in the example embodiment of FIG. 1, the database 142 can reside in a separate computer system or server. Details of the user music profiles 120 and group music profile 127 are discussed in more detail below.

As its name suggests, the user music profile 120 is a quantifiable representation of a user's music taste. For instance, a user music profile 120 receives a song as input and returns a distance score that is a prediction of the user's affinity to that song. During such processing, the audio manager 150 determines an affinity value 163 for each audio segment 125 in relation to each user music profile 120.

In operation, a user music profile 120 can be represented in a number of ways. In one representation, the user music profile 120 is the user's entire music collection positioned in the music similarity space. In such a representation, the user's affinity (e.g., the affinity value 163) to a new song can be calculated in a number of ways. For example:

Method 1: calculating the average distance of the new song to all of the songs in the user's collection.

Method 2: Calculating the average distance of the new song to the X nearest songs (where X is tunable but typically small (<10)).

For both methods the song distances can be weighted by the user's affinity for their own collection. For instance, if user 108-1 has listened to Song A 500 times but has listened to Song B only once, then Song A is given more consideration when predicting the affinity that user 108-1 may have to a new song. Likewise, a comparable method includes adding one copy of a song to the user music profile 120 for each time the song has been played. In using the example from above, Song A would appear in the user 108-1 user music profile 120-1 500 times, while Song B would appear only once. Similarly, user 108-1 may have applied manual ratings (e.g., predefined user preferences) to songs in their collection. Song C may have 5 stars (e.g., a high rating) while Song D may have a rating of 1 star (e.g., a poor rating).

There are a number of techniques commonly known in the art for reducing the computation required to calculate an affinity value 163 of a song in relation to a respective user or listener of the song. One such technique is to represent the user music profile 120 as a set of probability distributions (e.g., Gaussian distributions). Thus, instead of determining the affinity value 163 of a user to a song by calculating distances of the new song to each of the songs in the user space, the affinity value 163 can be determined by calculating the distance to the set of probability distributions (e.g., Gaussian distributions).

As will be discussed further in the steps below, a group music profile 127 is a representation of the music taste for multiple users 108 of the social environment 160. The group music profile 127 receives a song as input and returns a distance score (e.g., affinity value 163) that is a prediction of the group's affinity to that song. The group music profile 127 can use different social value metrics 162 to determine group affinity. Example social value metrics 162 may include, for example, the average happiness of the group members, the happiness of the most happy member, and/or the happiness of the least happy member, etc.

In the gaming context, additional social value metrics 162 may include, for instance, the maximum happiness of the game leader, the maximum misery of the game loser, and/or the average happiness of group members weighted by a player's rank, etc.

Generally, the processing involved in determining the group music profile 127 is similar to the processing of the user music profiles 120, as previously discussed. As such, the group music profile 127 can signify an aggregate representation of the user music profiles 120 for each user in the social environment 160, according to one example embodiment.

The group music profile 127 is the representation of taste for a number of users. One method of representing the group music profile 127 is to combine the user music profiles 120 of the various participants in the group. The audio segments (e.g., songs) in the music space are weighted such that users with large collections or active listening habits do not overwhelm the group. To reward successful users, the audio segments in the collection are weighted by the game rank of the members of the group. Audio segments owned by high-ranking members are given more weight than audio segments owned by low-ranking members. Furthermore, audio segments in the collection owned by low-ranking members (i.e. the losers) are negatively weighted so that the profile is biased to choose audio segments that are dissimilar to the taste of the losers, thus maximizing the music misery of the losers.

To find the affinity of the group for a particular audio segment, the same techniques that are used with a single user music profile can be used (e.g., average distance, average-nearest-neighbor distance, etc.).

The methods for determining music similarity amongst multiple audio segments are augmented by techniques discussed in co-pending patent application Ser. No. 11/650,289, filed Jan. 3, 2007, entitled "METHODS AND SYSTEM FOR RECOMMENDING MUSIC", which claims priority to provisional application No. 60/872,391, filed Dec. 6, 2006, both of which are incorporated herein by reference. Similarly, such methods are also augmented by techniques discussed in co-pending patent application Ser. No. 11/644,651, filed Dec. 22, 2006, entitled "METHODS AND APPARATUS FOR ACOUSTIC MODEL BASED SOUNDTRACKS", incorporated herein by reference.

Figure 2:
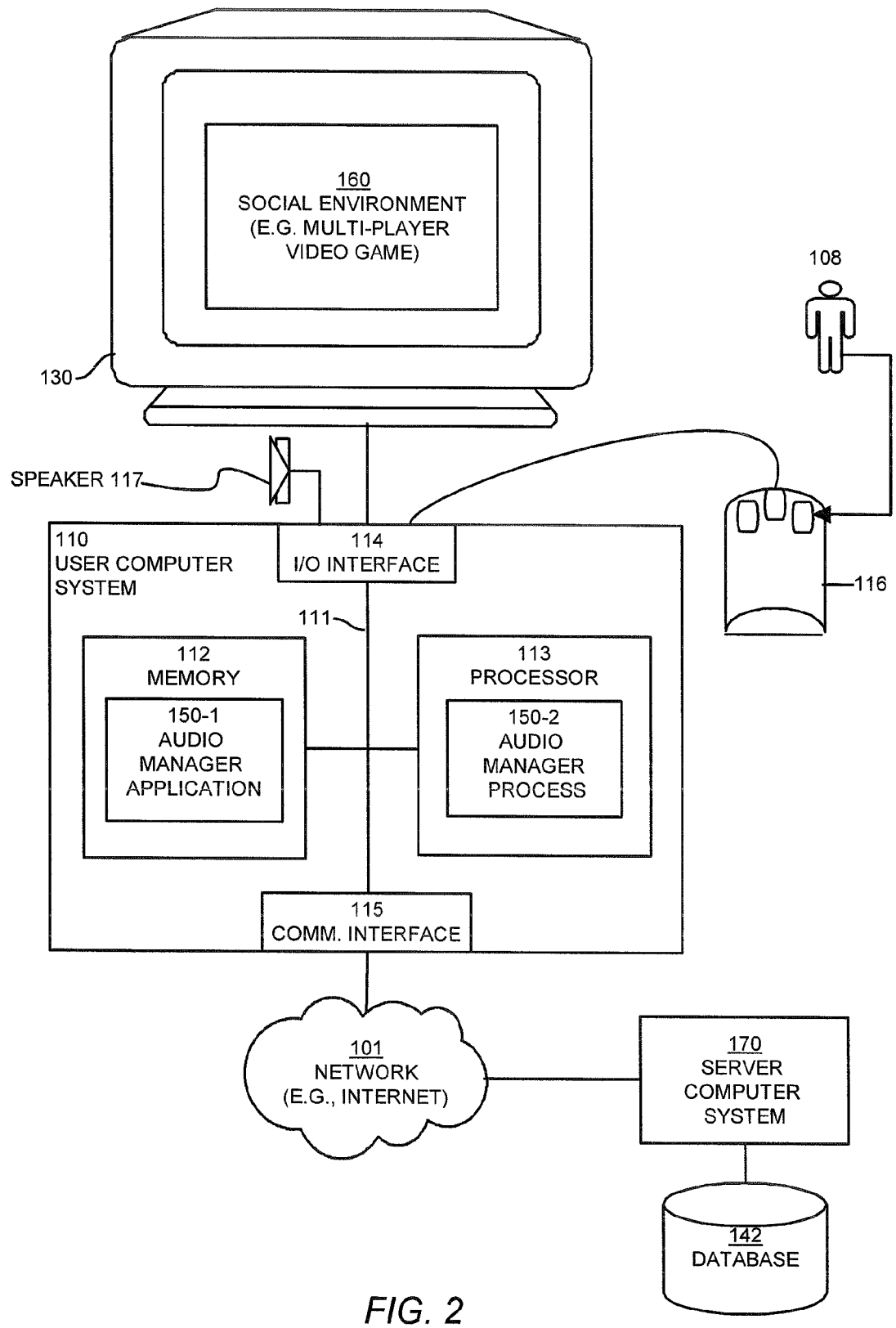
FIG. 2 is an example block diagram of a computer system configured with a audio manager application including an audio manager process in accordance with one example configuration.

FIG. 2 is a block diagram illustrating an example architecture of a user computer system 110 (e.g., user computer systems 110-1, 110-2 and 110-3) that executes, runs, interprets, operates or otherwise performs an audio manager 150. The computer system 110 may be any type of computerized device such as a personal computer, workstation, portable computing device, console, laptop, network terminal, client, etc. As shown in this example, the computer system 110 includes an interconnection mechanism 111 such as a data bus or other circuitry that couples a memory system 112, a processor 113, an input/output interface 114, and a communications interface 115.

An input device 116 (e.g., one or more user/developer controlled devices such as a pointing device, keyboard, mouse, etc.) couples to processor 113 through I/O interface 114, and enables a user 108 (e.g., a player in a multiplayer gaming environment) to provide input commands and generally control the graphical user interface 141 that the audio manager 150 provides for display on display 140.

The communications interface 115 enables the computer system 110 to communicate with other devices (e.g., other computers such as server computer system 170) over a respective a network 101 (e.g., a local area network, the Internet, etc.).

In one example embodiment, the server computer system 170 has a similar configuration and architecture as the user computer system 110 shown in FIG. 2. As such, the server computer system 170 can communicate with user computer systems 110 via network 101 (e.g., the Internet).

FIG. 2 also shows a database 142 in communication with the server computer system 170 (e.g., either as part of the server computer system 170 and/or accessible through a network on a separate device). The database 142 stores user 108 information such as, for example, audio segments 125, user music profiles 120 and the group music profile 127.

The memory system 112 can generally be any type of computer readable medium and (in this example) is encoded with an audio manager application 150-1. The audio manager application 150-1 may be embodied as software code such as data and/or logic instructions (e.g., code stored in the memory or on another computer readable medium such as a removable disk) that supports processing functionality according to different embodiments described herein.

During operation of the user computer system 110 (or server computer system 170), the processor 113 accesses the memory system 112 via the interconnect 111 in order to launch, run, execute, interpret or otherwise perform the logic instructions of the audio manager application 150-1. Execution of audio manager application 150-1 in this manner produces processing functionality in an audio manager process 150-2. In other words, the audio manager process 150-2 represents one or more portions of runtime instances of the audio manager application 150-1 performing or executing within or upon the processor 113 in the user computer system 110 at runtime.

FIGS. 3-8 present flow charts according to embodiments herein. The rectangular elements are herein denoted "steps" and represent computer software instructions or groups of instructions. The flow diagrams do not necessarily depict the syntax of any particular programming language. Rather, the flow diagrams illustrate the functional information one of ordinary skill in the art could use to fabricate circuits or to generate computer software to perform the processing required in accordance with the present invention.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3:
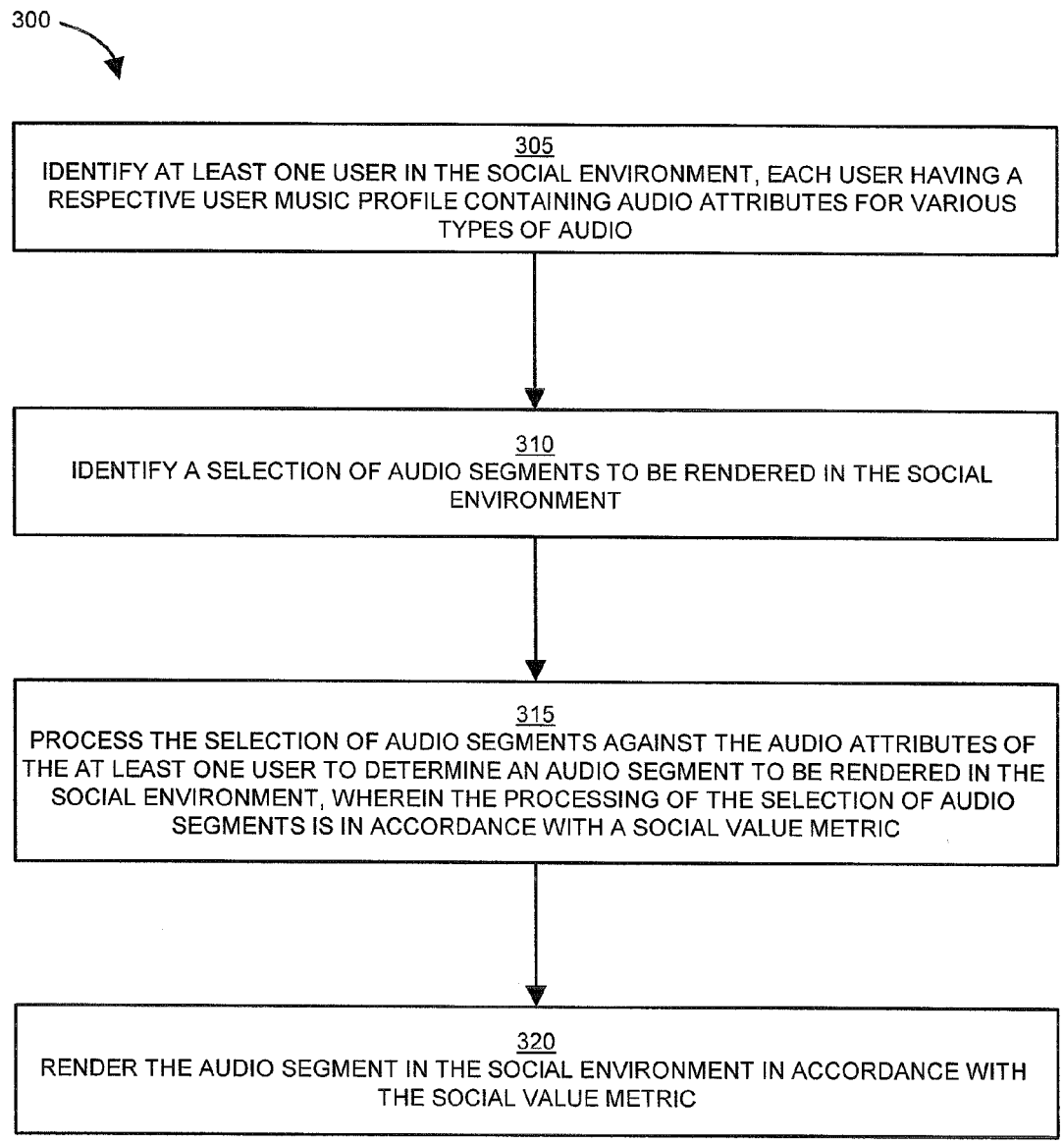
FIG. 3 is a flow chart of processing steps performed by an audio manager according to embodiments herein.

Now, more specifically, FIG. 3 is a flow chart 300 of processing steps that shows processing operations performed by the audio manager 150 in accordance with one example embodiment.

In step 305, the audio manager 150 identifies at least one user 108 in the social environment 160. According to this particular embodiment, each user has a respective user music profile 120 containing audio attributes 122 for various types of audio (e.g., background music, sound effects, etc). The audio attributes 122 may include user preferences and tastes with respect to particular music genres and classifications. An audio attribute may also be a predefined user rating of a particular audio segment 125. For example, a user 108 may rate their favorite songs with 4 or 5 stars, while rating less appealing songs with 1 or 2 stars.

In step 310, the audio manager 150 identifies a selection of audio segments 126 (e.g., one or more identified audio segments 125) to be rendered in the social environment 160. Referring to FIG. 1, path 180 represents the audio manager 150 identifying the selection of audio segments 126 from the audio segments 125 in database 142.

In one example embodiment, the audio manager 150 identifies the selection of audio segments 126 according to situational aspects associated with the social environment 160. For instance, the audio manager 150 may identify a selection of intense audio segments during an action sequence (e.g., battle or fight scene). Similarly, as another example the audio manager 150 may identify a selection of mellow or slower paced audio segments for less intense and casual situations in the social environment 160.

In step 315, the audio manager 150 processes the selection of audio segments 126 against the audio attributes 122 of at least one user 108 to determine an audio segment 125 to be rendered in the social environment 160. In this manner, the processing of the selection of audio segments 126 is in accordance with a social value metric 162.

Generally, as in one embodiment, the audio manager 150 sets the social value metric 162 according to an administrator of the social environment 160. For example, the administrator of the social environment 160 can be a website administrator, an online gaming administrator, a program or application associated with the social environment (e.g., software associated with a multiplayer game), etc. Alternatively, the audio manager 150 sets the social value metric 162 according to at least one user 108 of the social environment 160. In other words, a user (or users) of the social environment 160 (e.g., multiplayer gaming environment) can determine and set the parameters of the game, such as the social value metric 162 in this example.

Example social value metrics 162 may include, for example, the average happiness of the group members, the happiness of the most happy member, the happiness of the least happy member, the maximum happiness of the game leader, the maximum misery of the game loser, and/or the average happiness of group members weighted by a player's rank, etc.

In step 320, the audio manager 150 renders the audio segment 125 in the social environment 160 in accordance with the social value metric 162. For example, if the social value metric 162 relates to the maximum happiness of the game leader, the audio manager 150 renders an audio segment (e.g., audio segment 125-1) in the social environment that is most appealing to the game leader in the social environment 160. Thus, the computer systems 110 render that particular audio segment (e.g., audio segment 125-1) via its respective speaker 117 for each user 108 to hear.

Figure 4:
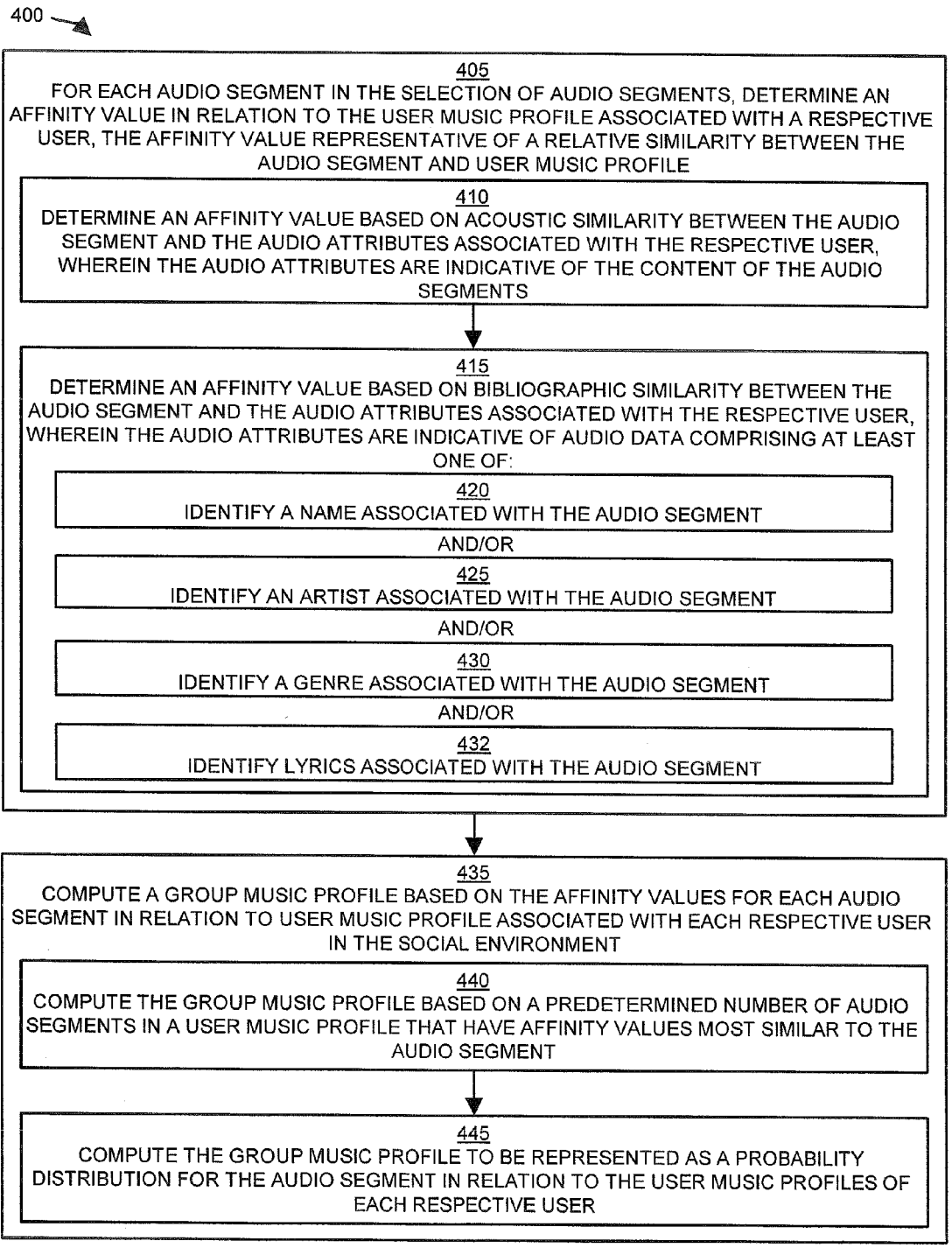
FIG. 4 is a flow chart of processing steps performed by an audio manager according to embodiments herein.

FIG. 4 is a flow chart 400 of processing steps that shows processing operations performed by the audio manager 150 in accordance with one example embodiment.

In step 405, for each audio segment 125 in the selection of audio segments 126, the audio manager 150 determines an affinity value 163 in relation to the user music profile 120 associated with a respective user 108. In this manner, the affinity value 163 is representative of a relative similarity between the audio segment 125 and user music profile 120.

In step 410, the audio manager 150 determines an affinity value 163 based on acoustic similarity between the audio segment 125 and the audio attributes 122 associated with the respective user 108. The audio attributes 122 are indicative of the content of the audio segments (e.g., tempo, rhythm, etc.) and/or the user preferences related to the particular audio segment 125.

In step 415, the audio manager 150 determines an affinity value 163 based on bibliographic similarity between the audio segment 125 and the audio attributes 122 associated with the respective user 108. As such, the audio attributes 122 are indicative of audio data (e.g., song name, artist name, genre, lyrics, etc).

In step 420, the audio manager 150 identifies a name associated with the audio segment 125.

In step 425, the audio manager 150 identifies an artist associated with the audio segment 125.

In step 430, the audio manager 150 identifies a genre associated with the audio segment 125.

In Step 432, the audio manager 150 identifies lyrics associated with the audio segment 125.

In step 435, the audio manager 150 computes a group music profile 127 based on the affinity value 163 for each audio segment 125 in relation to a user music profile 120 associated with each respective user 108 in the social environment 160. Referring again to FIG. 1, path 181 represents the audio manager 150 processing the affinity value 163 against each user music profile 120 to create the group music profile 127.

In step 440, the audio manager 150 computes the group music profile 127 based on a predetermined number of audio segments 125 in a user music profile 120 that have the highest affinity value 163 to the audio segment 125. For example, in one embodiment the audio manager 150 computes the group music profile 127 based on the ten songs in a user music profile 120 having the nearest affinity value 163 to the given audio segment 125.

In step 445, the audio manager 150 computes the group music profile 127 to be represented as a probability distribution (e.g., Gaussian distribution) for the audio segment 125 in relation to the user music profiles 120 of each respective user 180.

Figure 5:
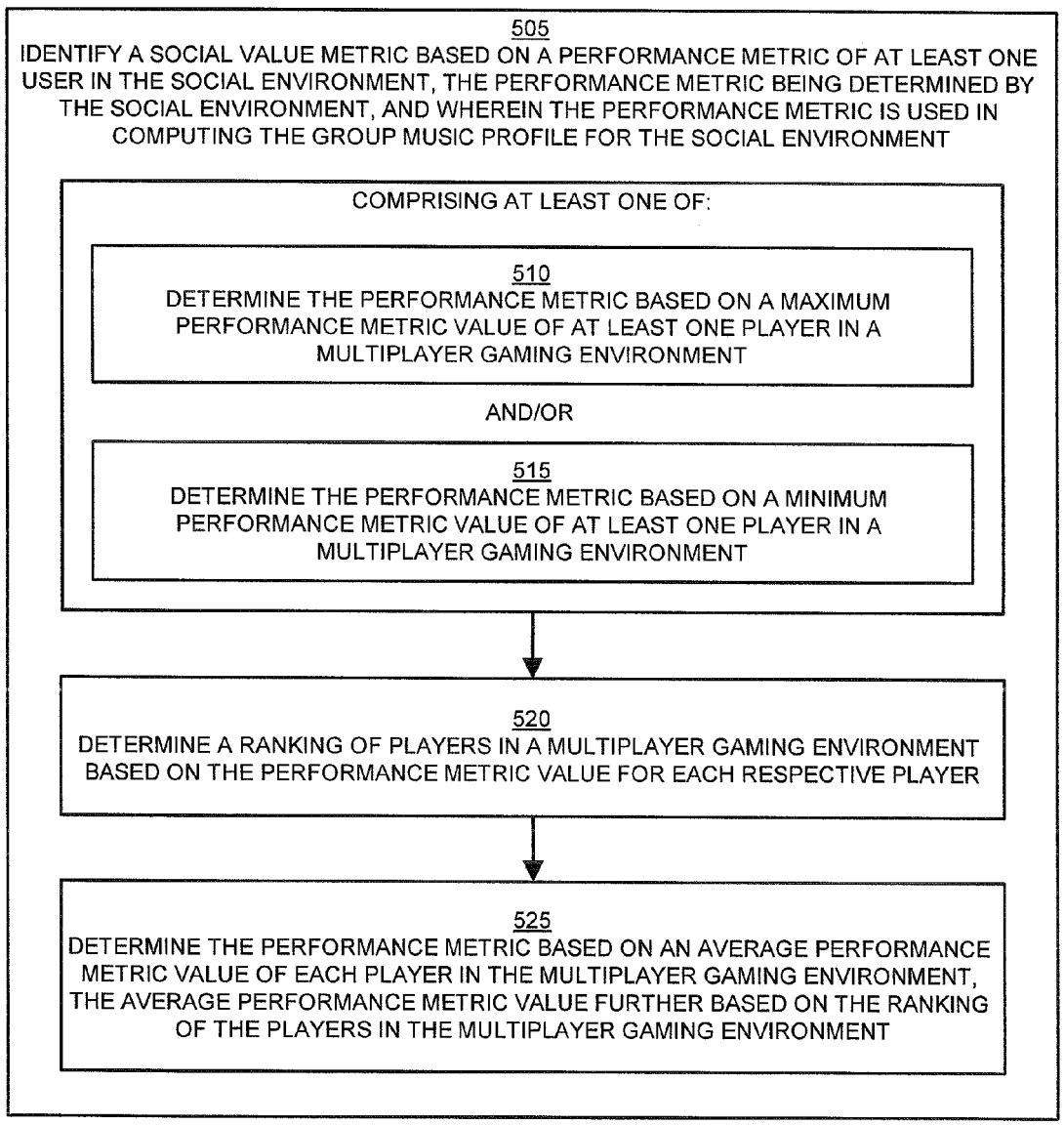
FIG. 5 is a flow chart of processing steps performed by an audio manager according to embodiments herein.

FIG. 5 is a flow chart 500 of processing steps that shows processing operations performed by the audio manager 150 in accordance with one example embodiment.

In step 505, the audio manager 150 identifies a social value metric 162 based on a performance metric of at least one user 108 in the social environment 160. For example, the performance metric may measure the level of skill of a user 108 or how well the user 108 is performing in the social environment 160.

During such processing, the social environment 160 determines the performance metric. The audio manager 150 then uses the performance metric in computing the group music profile 127 for the social environment 160.

In step 510, the audio manager 150 determines the performance metric based on a maximum performance metric value of at least one player in a multiplayer gaming environment. According to one embodiment, the maximum performance metric is used in determining the maximum happiness of the game leader in the social environment 160.

In step 515, the audio manager 150 determines the performance metric based on a minimum performance metric value of at least one player in a multiplayer gaming environment. For instance, in one embodiment the minimum performance metric is used in determining maximum misery of the game loser in the social environment 160.

In step 520, the audio manager 150 determines a ranking of players in a multiplayer gaming environment based on the performance metric value for each respective player (e.g., user 108-1). For example, players with greater performance metric values will have higher rankings than players with lesser performance metric values.

In step 525, the audio manager 150 determines the performance metric based on an average performance metric value of each player in the multiplayer gaming environment. In an example embodiment, the average performance metric value is based on the ranking of the players in the multiplayer gaming environment 160. Thus, the audio manager 150 can use the average performance metric value in determining the average happiness of group members weighted by a player's rank.

Figure 6:
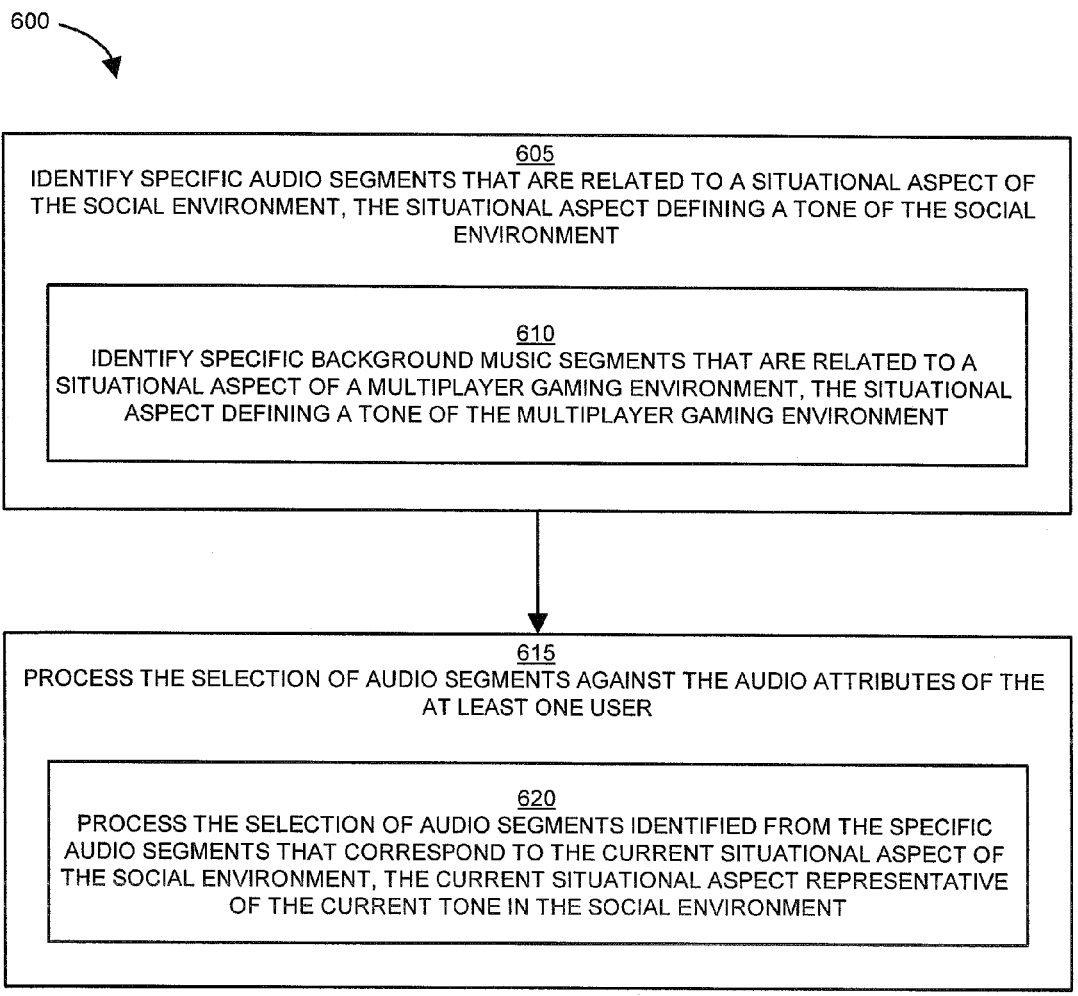
FIG. 6 is a flow chart of processing steps performed by an audio manager according to embodiments herein.

FIG. 6 is a flow chart 600 of processing steps that shows processing operations performed by the audio manager 150 in accordance with one example embodiment.

In step 605, the audio manager 150 identifies specific audio segments 125 that are related to a situational aspect of the social environment 160. In this manner, the situational aspect defines a tone or atmosphere (e.g., high intensity, casual gaming, etc.) of the social environment 160.

In step 610, the audio manager 150 identifies specific background music segments that are related to a situational aspect of a multiplayer gaming environment 160. For example, in one embodiment the audio manager 150 identifies high intensity background music segments for battle or fighting scenes in a multiplayer gaming environment.

In step 615, the audio manager 150 processes the selection of audio segments 125 against the audio attributes 120 of the at least one user 108. Processing of step 615 is similar to the processing of step 315 as previously discussed.

In step 620, the audio manager 150 processes the selection of audio segments 126 identified from the specific audio segments 125 that correspond to the current situational aspect of the social environment 160. As such, the current situational aspect is representative of the current atmosphere (e.g., high intensity, casual, etc.) in the social environment 160. Thus, the audio manager 150 can determine audio segments 125 to be rendered for a current situational aspect (e.g., battle scene) according to the group music profile 127 and, thus, dynamically accommodate the preferences and tastes of the users 108 interacting with the social environment 160.

Figure 7:
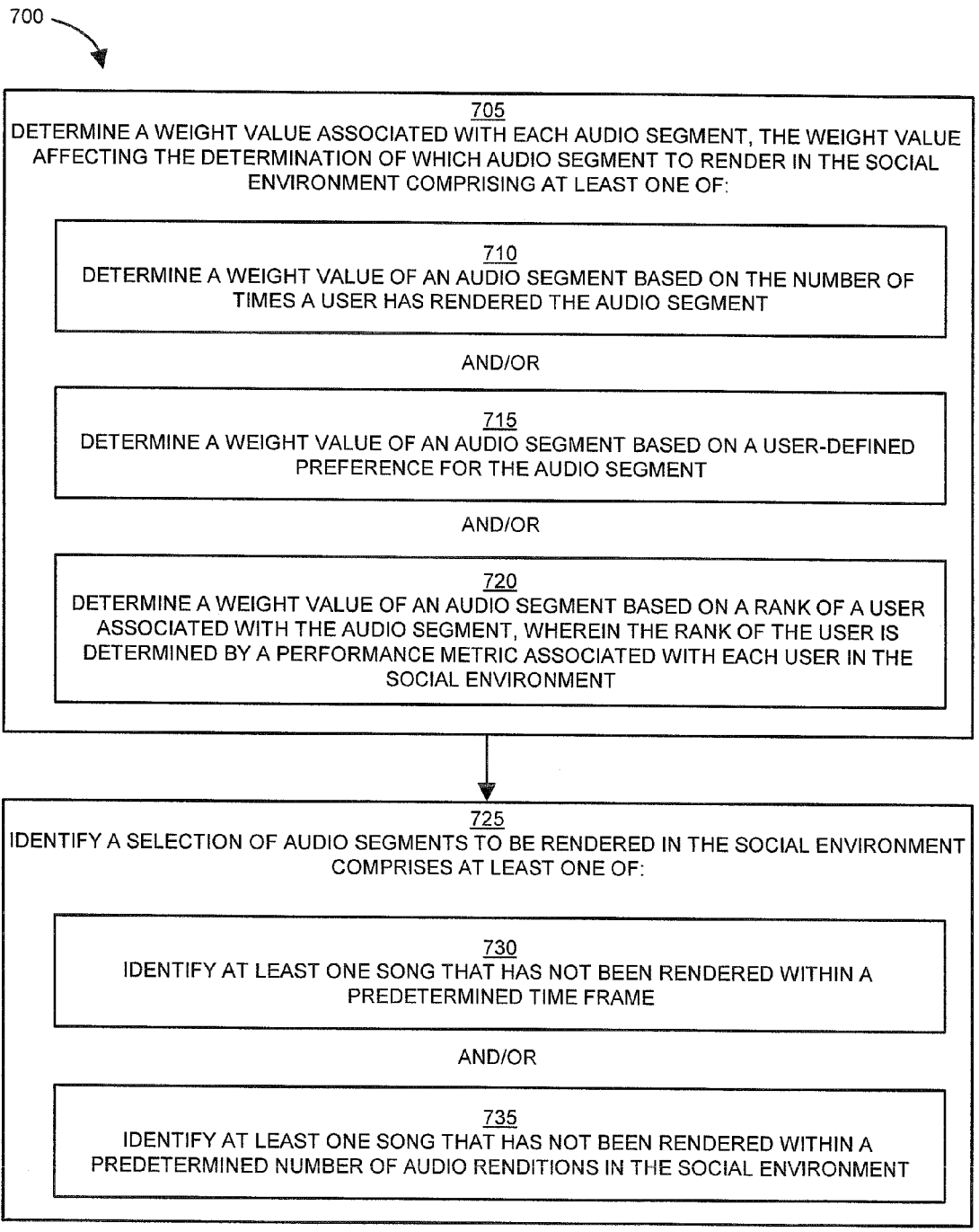
FIG. 7 is a flow chart of processing steps performed by an audio manager according to embodiments herein.

FIG. 7 is a flow chart 700 of processing steps that shows processing operations performed by the audio manager 150 in accordance with one example embodiment.

In step 705, the audio manager 150 determines a weight value associated with each audio segment 125. In operation, the weight value affects the determination of which audio segment 125 to render in the social environment 160. For example, the weight value can correspond to a predefined user rating of a given audio segment 125 (e.g., user 108-2 assigns a rating of 5 stars for audio segment 125-M).

In step 710, the audio manager 150 determines a weight value of an audio segment 125 based on the number of times a user has rendered the audio segment 125. If, for example, a user 108 has rendered an audio segment 125 several times, the audio segment assigns a greater weight value to that particular audio segment 125 since it is apparent that the audio segment 125 appeals to the user 108.

In step 715, the audio manager 150 determines a weight value of an audio segment 125 based on a user-defined preference for the audio segment 125 (e.g., user 108-N assigns a rating of 3 stars for audio segment 125-2).

In step 720, the audio manager 150 determines a weight value of an audio segment 125 based on a rank of a user 108 associated with the audio segment 125. In this manner, the audio manager 150 determines the rank of the user 108 by a performance metric associated with each user 108 in the social environment 160, as previously discussed in steps 520 and 525.

In step 725, the audio manager 150 identifies a selection of audio segments 125 to be rendered in the social environment 160. Processing of step 725 is similar to the processing of step 310 as previously discussed.

In step 730, the audio manager 150 identifies at least one song that has not been rendered within a predetermined time frame. Processing of step 730 mitigates the effect of the repetitive rendition of songs in the social environment 160.

In step 735, the audio manager 150 identifies at least one song that has not been rendered within a predetermined number of audio renditions in the social environment 160. Similar to step 730, processing of step 735 mitigates the effect of the repetitive rendition of songs in the social environment 160.

Figure 8:
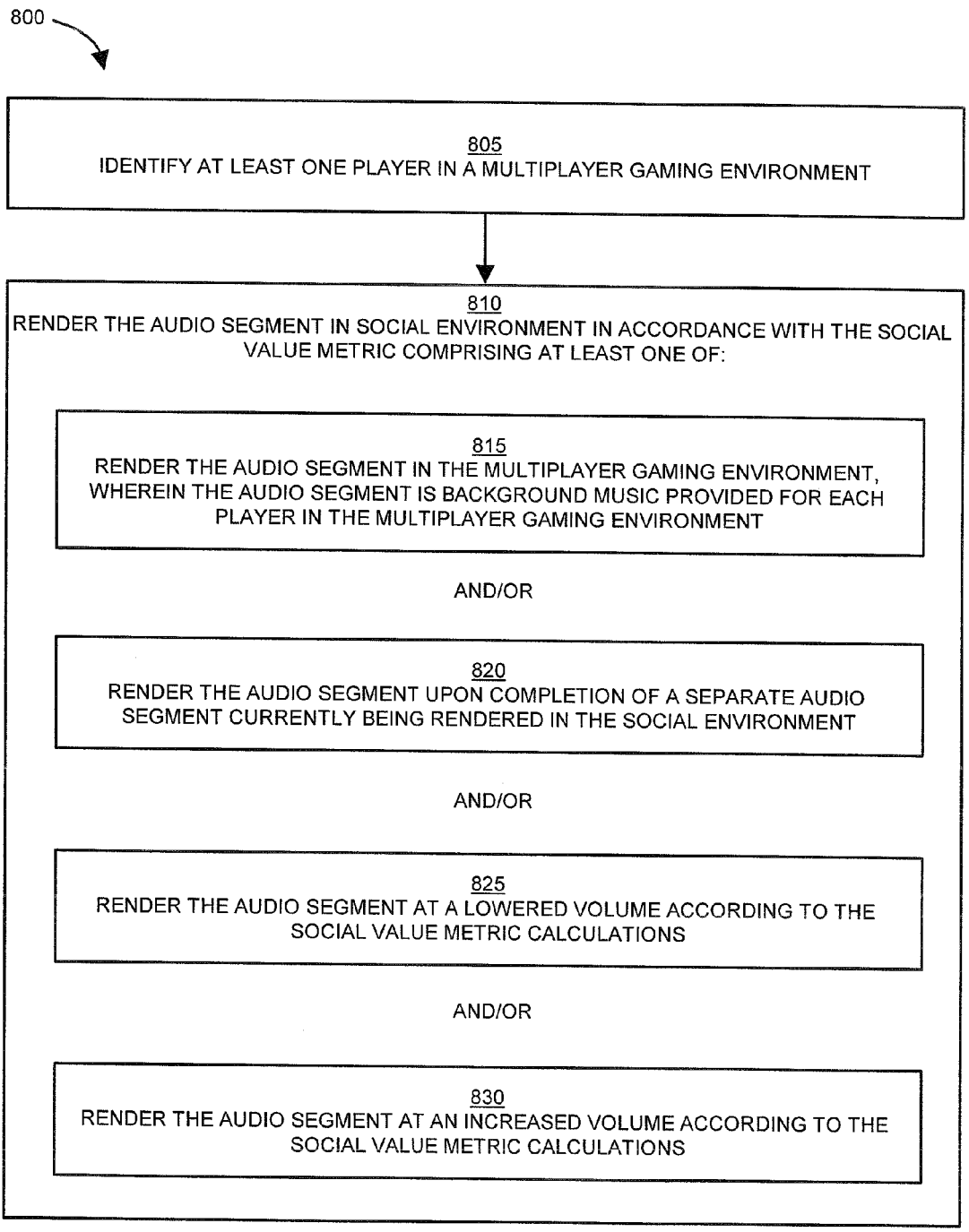
FIG. 8 is a flow chart of processing steps performed by an audio manager according to embodiments herein.

FIG. 8 is a flow chart 800 of processing steps that shows processing operations performed by the audio manager 150 in accordance with one example embodiment.

In step 805, the audio manager 150 identifies at least one player (e.g., user 108-1) in a multiplayer gaming environment (e.g., social environment 160).

In step 810, the audio manager 150 renders the audio segment 125 in the social environment in accordance with the social value metric 163. Processing of step 810 is similar to the processing of step 320 as previously discussed.

In step 815, the audio manager 150 renders the audio segment 125 in the multiplayer gaming environment (e.g., social environment 160). In such a configuration, the audio segment 125 is the background music provided for each player (e.g., user 108) in the multiplayer gaming environment (e.g., via speaker 117).

In step 820, the audio manager 150 renders the audio segment 125 upon completion of a separate audio segment 125 currently being rendered in the social environment 160. Thus, processing of step 820 provides for the continuous rendition of audio segments 125 in the social environment 160 without having time gaps in between the rendition of sequential audio segments 125.

In step 825, the audio manager 150 renders the audio segment at a lowered volume according to the social value metric 162 calculations.

In step 830, the audio manager 150 renders the audio segment at an increased volume according to the social value metric 162 calculations.

For example, by increasing or decreasing the volume of an audio segment 125, the audio manager 150 can reward or punish certain users 108 depending on the social value metric 162 calculations. As such, if the social value metric is related to the maximum happiness of the game leader, the audio manager 150 can increase the volume of the audio segment 125 for the game leader.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims.

Note that the different embodiments disclosed herein can be combined or utilized individually with respect to each other.

What is claimed is:

1. A method for providing audio in a competitive gaming environment comprising:
at one or more computing devices,
identifying a plurality of users in the competitive gaming environment, each of the users having a user music profile containing audio attributes for various types of audio and a social value metric determined by a skill of the user in performing one or more tasks within the competitive gaming environment;
identifying a selection of audio segments to be rendered in the competitive gaming environment;
processing the selection of audio segments against the audio attributes of the user whose social value metric has a maximum value to determine an audio segment to be rendered in the competitive gaming environment; and
rendering the audio segment in the competitive gaming environment in accordance with the social value metric having the maximum value.

2. The method of claim 1 wherein processing the selection of audio segments comprises:
for each audio segment in the selection of audio segments, determining an affinity value in relation to the user music profile associated with a respective user, the affinity value representative of a relative similarity between the audio segment and user music profile; and
computing a group music profile based on the affinity values for each audio segment in relation to user music profile associated with each respective user in the competitive gaming environment.

3. The method of claim 2 wherein computing a group music profile comprises:
computing the group music profile based on a predetermined number of audio segments in a user music profile that have affinity values most similar to the audio segment.

4. The method of claim 2 wherein computing a group music profile comprises:
computing the group music profile to be represented as a probability distribution for the audio segment in relation to the user music profiles of each respective user.

5. The method of claim 2 wherein determining an affinity value comprises:
determining an affinity value based on acoustic similarity between the audio segment and the audio attributes associated with the respective user, wherein the audio attributes are indicative of the content of the audio segments.

6. The method of claim 2 wherein determining an affinity value comprises:
determining an affinity value based on bibliographic similarity between the audio segment and the audio attributes associated with the respective user, wherein the audio attributes are indicative of audio data comprising at least one of:
identifying a name associated with the audio segment;
identifying an artist associated with the audio segment;
identifying a genre associated with the audio segment;
identifying lyrics associated with the audio segment.

7. The method of claim 1 wherein identifying the selection of audio segments comprises:
identifying specific audio segments that are related to a situational aspect of the competitive gaming environment, the situational aspect defining a tone of the competitive gaming environment; and
wherein processing the selection of audio segments against the audio attributes of the user comprises:
processing the selection of audio segments identified from the specific audio segments that correspond to the current situational aspect of the competitive gaming environment, the current situational aspect representative of the current tone in the competitive gaming environment.

8. The method of claim 1 wherein processing the selection of audio segments comprises:
determining a weight value associated with each audio segment, the weight value affecting the determination of which audio segment to render in the competitive gaming environment.

9. The method of claim 8 wherein determining a weight value associated with each audio segment comprises at least one of:
determining a weight value of an audio segment based on the number of times a user has rendered the audio segment; and determining a weight value of an audio segment based on a user-defined preference for the audio segment.

10. The method of claim 1 wherein identifying a selection of audio segments to be rendered in the competitive gaming environment comprises at least one of:
   identifying at least one song that has not been rendered within a predetermined time frame; and
   identifying at least one song that has not been rendered within a predetermined number of audio renditions in the competitive gaming environment.

11. The method of claim 1 wherein rendering the audio segment in the competitive gaming environment in accordance with the social value metric having the maximum value comprises at least one of:
   rendering the audio segment upon completion of a separate audio segment currently being rendered in the competitive gaming environment;
   rendering the audio segment at a lowered volume according to the social value metric calculations; and
   rendering the audio segment at an increased volume according to the social value metric calculations.

12. A computer system comprising:
   a memory;
   a processor;
   a communications interface;
   an interconnection mechanism coupling the memory, the processor and the communications interface; and
   wherein the memory is encoded with an audio manager application that when executed on the processor configures the processor to be capable of performing the operations of:
   identifying a plurality of users in the competitive gaming environment, each of the users having a user music profile containing audio attributes for various types of audio and a social value metric determined by a skill of the user in performing one or more tasks within the competitive gaming environment;
   identifying a selection of audio segments to be rendered in the competitive gaming environment;
   processing the selection of audio segments against the audio attributes of the user whose social value metric has a maximum value to determine an audio segment to be rendered in the competitive gaming environment; and
   rendering the audio segment in the competitive gaming environment in accordance with the social value metric having the maximum value.

13. The computer system of claim 12 wherein processing the audio segments comprises:
   determining an affinity value for an audio segment in relation to the user music profile associated with a respective user, the affinity value representative of a relative similarity between the audio segment and user music profile; and
   computing a group music profile for the audio segment, wherein the group music profile is based on affinity values for that audio segment in relation to user music profile for each of the users.

14. A non-transitory computer-readable medium having instructions stored thereon, the instructions, when executed by a processing device, enabling the processing device to perform operations of:
   identifying a plurality of users in the competitive gaming environment, each of the users having a user music profile containing audio attributes for various types of audio and a social value metric determined by a skill of the user in performing one or more tasks within the competitive gaming environment;
   identifying a selection of audio segments to be rendered in the competitive gaming environment;
   processing the selection of audio segments against the audio attributes of the user whose social value metric has a maximum value to determine an audio segment to be rendered in the competitive gaming environment; and
   rendering the audio segment in the competitive gaming environment in accordance with the social value metric having the maximum value.

* * * * *